United States Patent [19]

Kelsey

[11] 4,332,237

[45] Jun. 1, 1982

[54] HEAT GENERATOR APPARATUS

[76] Inventor: Paul G. Kelsey, Rte. 2, Box 876, Claremore, Okla. 74017

[21] Appl. No.: 145,450

[22] Filed: May 1, 1980

[51] Int. Cl.[3] ............................. F24C 9/00; F22B 9/06
[52] U.S. Cl. ....................................... 126/247; 122/26
[58] Field of Search ........................... 126/247; 122/26

[56] References Cited

U.S. PATENT DOCUMENTS

| | | | |
|---|---|---|---|
| 1,819,057 | 8/1931 | Archer | 126/247 |
| 3,752,395 | 8/1973 | Ashikian | 122/26 |
| 3,822,740 | 7/1974 | Hackett | 126/247 |
| 3,952,723 | 4/1976 | Browning | 126/247 |
| 3,989,189 | 11/1976 | Kita | 122/26 |
| 4,114,809 | 9/1978 | Sampson | 122/26 |
| 4,143,522 | 3/1979 | Hamrick et al. | 126/247 |
| 4,192,456 | 3/1980 | Shields et al. | 122/26 |

*Primary Examiner*—Henry C. Yuen
*Attorney, Agent, or Firm*—Head & Johnson

[57] ABSTRACT

A heat generator apparatus comprising a shaft coupled with the rotatable blades of a windmill for rotation about a longitudinal axis, the shaft being the drive shaft of a hydraulic pump which has both the intake port and discharge port in communication with a fluid reservoir whereby the fluid will be circulated from the reservoir, through the pump, and back to the reservoir continuously during rotation of the drive shaft. The pump functions in the manner of a heat pump for transmitting heat to the fluid passing therethrough, and thus heat is generated within the fluid reservoir, and the heat may be extracted for use by any suitable heat exchanger apparatus.

1 Claim, 1 Drawing Figure

U.S. Patent
Jun. 1, 1982
4,332,237
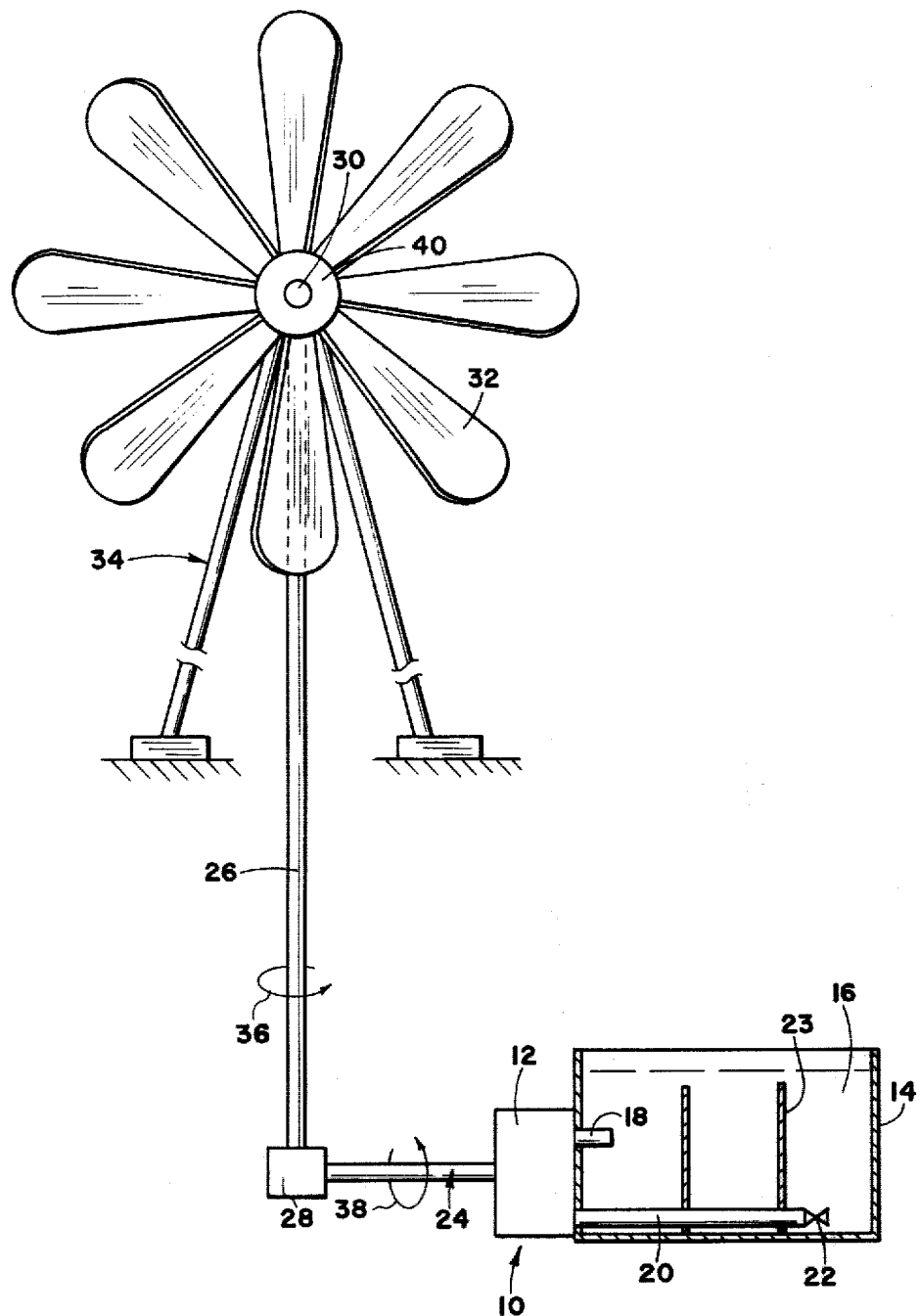

HEAT GENERATOR APPARATUS

BACKGROUND OF THE INVENTION

1. Field of the Invention

This invention relates to improvements in heat generating apparatus and more particularly, but not by way of limitation, to a heat pump apparatus actuated by a windmill for producing hot fluid within a fluid reservoir.

2. Description of the Prior Art

The present day energy crisis has created many problems in the production of heat, electricity, and the like, and there is much activity in the field for achieving the production of heat and power in a manner which eliminates the use of fossil fuels. For example, great interest has been given to the use of windmills and the like for the production of electricity, and there is much concentrated effort in the develop of solar energy for the production of heat. These methods, at best, have been only stop gap measures and there is still great need for advancement in both the production of power and heat in an energy saving manner.

SUMMARY OF THE INVENTION

The present invention contemplates a novel heat generator apparatus which has been particularly designed and constructed for overcoming many of the disadvantages of the present day solutions to the shortage of energy. The novel apparatus comprises a heat pump having the drive shaft thereof suitably coupled with the rotor of a windmill whereby the drive shaft will be rotated by natural forces for the actuation of the heat pump. The heat pump circulates a suitable hydraulic fluid from a fluid reservoir, through the pump and back to the fluid reservoir and transmits heat to the fluid for creating a hot condition within the fluid reservoir. Of course, suitable heat sensing means is preferably provided in the fluid reservoir and in operable connection with the blades of the rotor for alteration of the speed of rotation thereof in order to eliminate any overheating within the fluid reservoir. The heat within the reservoir may be extracted by a suitable heat exchanger, or the like, as is well known. The novel heat generator apparatus is simple and efficient in operation and economical and durable in construction.

BRIEF DESCRIPTION OF THE DRAWINGS

The FIGURE is a side elevational schematic view of a heat generator apparatus embodying the invention, with portions thereof shown in elevation for purposes of illustration.

DESCRIPTION OF THE PREFERRED EMBODIMENT

Referring to the drawings in detail, reference character 10 generally indicates a heat generator apparatus comprising a suitable pump 12 such as a hydraulic positive displacement pump, installed in the proximity of a vessel or housing 14 which contains a reservoir of a suitable fluid 16 such as the hydraulic fluid normally utilized in a hydraulic pump. The pump 12 is provided with an inlet means 18 having the outer end thereof open to the fluid 16 within the reservoir for directing the fluid into the interior of the pump 12 during action of the pump, as is well known. The pump 12 is also provided with a discharge means 20 for delivery of the hydraulic fluid from the interior of the pump 12 into the housing 14. The discharge means 20 is provided with a suitable restrictive valve 22 at the outer end thereof whereby the fluid being discharged through the means 20 is heated, as is well known in heat pumps, and thus, the fluid discharging from the valve 22 into the reservoir 16 is hot. A plurality of spaced baffles 23 may be provided in the housing 4, if desired, for controlling the flow of fluid recirculating through the reservoir 16 from the valve 22 to the intake port or inlet means 18. The fluid 16 is constantly cycled through the pump 12 during actuation of the pump, and it will be apparent that the temperature of the fluid 16 will be heated to relatively high temperatures. As a result, it is preferable that suitable sensors (not shown) be provided in communication with the reservoir for detecting the temperature of the fluid 16. The sensors are operably connected with suitable blade-pitch control means (not shown) in any well known manner whereby the pitch of the blades 32 may be automatically adjusted in response to the temperature conditions in the reservoir 16 in order that a preselected optimum temperature range may be maintained for the fluid in a manner as will be hereinafter set forth.

The pump 12 is actuated in the usual manner by a suitable drive shaft 24 which is operably secured to an upstanding rotatable shaft 26 by a suitable coupling or gear box 28. The shaft 26 is operably connected with the output shaft 30 of the rotor or blades 32 of any suitable windmill assembly generally indicated at 34. The shaft 26 is coupled with the output shaft 30 in any suitable manner (not shown) whereby the rotation of the shaft 30 transmits rotation to the shaft 26 about its own longitudinal axis in the direction indicated by the arrow 36. The coupling or gear box 28 connected the drive shaft 24 with the shaft 26 in such a manner that the shaft 24 is rotated about its longitudinal axis in the direction indicated by the arrow 38. It is preferable that the blades 32 of the windmill 34 be adjustably secured to the hub member 40 of the windmill whereby the angular position of the plane of the blades may be adjusted in order to control the rotational speed of the blades about the axis of the output shaft 30, thus providing for control of the rotational speed of the shafts 26 and 24. Of course, the rotational speed of the shaft 24 controls the operational speed of the pump 12, as is well known. Thus, when the sensors (not shown) which detect the temperature of the fluid 16 within the housing 4 sense a temperature which is above the preselected maximum temperature for the fluid, the pitch or angular orientation of the blades 32 may be properly adjusted for reducing the speed of operation of the pump 12. Conversely, if the temperature detected by the sensor falls below the desirable preselected minimum temperature for the fluid 16, the angular orientation or pitch of the blades 32 may be properly adjusted for increasing the speed of rotation of the shaft 30, and thus increase the operational speed of the pump 12.

The heat contained within the reservoir 16 may be extracted by any suitable heat exchanger apparatus (not shown). For example, a heat exchanger having a plurality of fluid circulating tubes (not shown) provided therein may be installed in communication with the fluid 16 whereby the fluid may be circulated through the tubes in order that heat may be radiated in the usual manner of operation for the heat exchanger. The fluid may be returned to the reservoir 16, thus providing a completely closed system which conserves the hydraulic fluid.

As the windmill is actuated by the ambient atmospheric conditions, the pump 12 will be actuated whereby the fluid in the reservoir 16 will be constantly drawn into the pump through the inlet port means 18, and discharged from the pump through the outlet discharge port means and the restrictive valve means 22. The fluid emitting from the valve means 22 is hot and during continued operation of the pump 12, the heat of the fluid in the reservoir 16 will continually increase. Of course, when the maximum desired temperature of the fluid 16 is reached, it is preferable that the sensors (not shown) reduce the speed of rotation of the blades 32 about the axis of the shaft 30 thus slowing the operation of the pump, or perhaps in some instances completely stopping the operation of the pump. In the event the temperature of the fluid 16 falls below a preselected desirable minimum temperature for the fluid, the sensors will cause an adjustment of the pitch of the blades 32 for increasing the speed of rotation of the blades about the axis of the shaft 30 for increasing the speed of operation for the pump 12, which results in an increase of the heat or temperature of the fluid 16.

From the foregoing it will be apparent that the present invention provides a novel heat generator apparatus operably connected with a suitable windmill whereby a fluid reservoir is maintained at a preselected temperature which may be extracted by a suitable heat exchanger apparatus. The novel generator comprises a pump having the inlet side thereof open to the fluid of the fluid reservoir, and the discharge side thereof in communication with the fluid of the fluid reservoir through a restrictive valve whereby the pump functions in the manner of a heat pump for heating of the fluid. The fluid system is a closed system, and the continued operation of the pump maintains a preselected temperature for the fluid to assure a constant supply of hot fluid for the heat exchanger apparatus.

Whereas the present invention has been described in particular relation to the drawings attached hereto, it should be understood that other and further modifications, apart from those shown or suggested herein may be made within the spirit and scope of this invention.

What is claimed is:

1. In combination with a windmill having adjustable rotatable blades, a heat generator apparatus comprising pump means operably connected with the windmill for actuation thereby and having fluid inlet and fluid outlet means, a fluid reservoir having a fluid supply in simultaneous communication with both the fluid inlet and fluid outlet means of the pump means whereby the fluid is continuously circulated from the reservoir and through the pump means and back to the reservoir during actuation of the pump means, and restrictive valve means provided in the fluid outlet means for heating of the fluid discharging from the pump means whereby the temperature conditions in the fluid reservoir may be increased to an optimum heating of the fluid for use in a heating operation, the pump means is provided with drive shaft means, and coupling drive means is interposed between the drive shaft means and the windmill to rotate the drive shaft means for actuation of the pump means, and wherein the coupling drive means comprises a substantially vertical rotatable shaft having one end operably connected with the rotatable blades for rotation of the vertical shaft about its own longitudinal axis, and coupling means interconnected between the vertical shaft and the drive shaft for transmitting rotation to the drive shaft for actuation of the pump means, the fluid reservoir includes housing means for containing the fluid therein whereby the level of the fluid encompasses both the fluid inlet and fluid outlet means and baffle means provided in said housing means for controlling the flow of the fluid during the circulation thereof through the fluid reservoir.

* * * * *